(Model.)
M. WEISS.
TYPE WRITING MACHINE.
No. 383,383. Patented May 22, 1888.
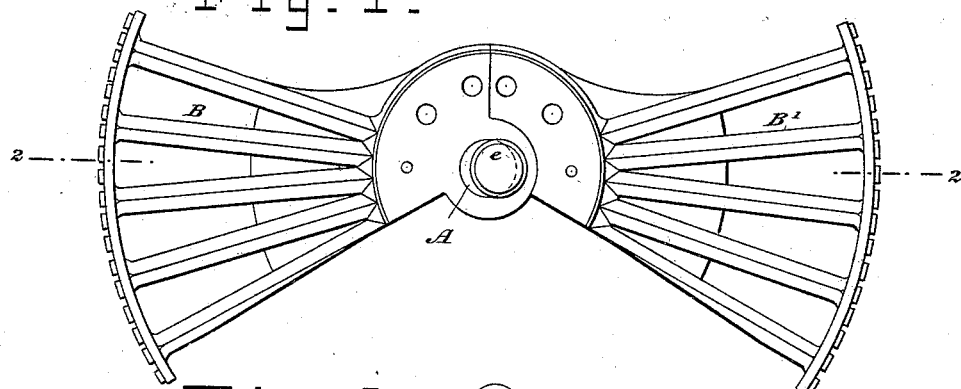
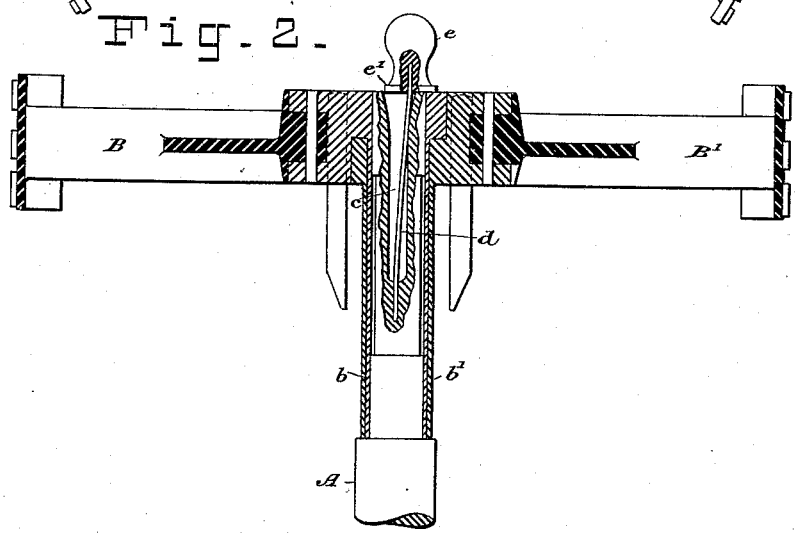
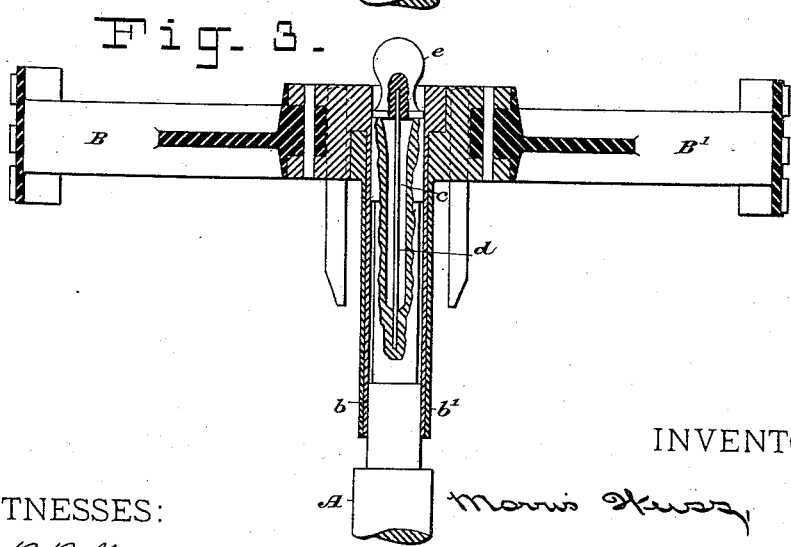
WITNESSES:
INVENTOR:
Morris Weiss
By Henry Connett
Attorney.

UNITED STATES PATENT OFFICE.

MORRIS WEISS, OF BROOKLYN, NEW YORK.

TYPE-WRITING MACHINE.

SPECIFICATION forming part of Letters Patent No. 383,383, dated May 22, 1888.

Application filed June 18, 1887. Serial No. 211,733. (Model.)

*To all whom it may concern:*

Be it known that I, MORRIS WEISS, a citizen of the United States, and a resident of Brooklyn, Kings county, New York, have invented certain Improvements in Type-Writing Machines, of which the following is a specification.

My invention relates to a certain improvement in the well-known "Hammond" typewriter. The object and purpose of my invention will be best understood by reference to the accompanying drawings, which form a part of this specification, and to the description following the reference thereto.

In the said drawings I have not deemed it necessary to show the entire machine, as that is well known, and forms no part of my invention. I have simply shown that part of the machine to which my invention relates.

Figure 1 is a plan of the type-wheels of the machine and the non-rotative stem on which said wheels are rotatively mounted, illustrating my improvement. Fig. 2 is a vertical axial section of same taken in the plane indicated by line 2 2 in Fig. 1. Fig. 3 is a sectional view similar to Fig. 2, showing the type-wheels partly slipped off from their stem.

All of the views are on a scale about one-third larger than the parts usually are in the machine. The object of this enlargement is to enable the construction to be seen more clearly.

A is the non-rotative stem or spindle of the ordinary Hammond type-writer, and B B' are the two ordinary type-wheels, rotatively mounted on said stem. The wheel B has an elongated sleeve-like bearing, *b*, which fits the cylindrical stem snugly, and the wheel B' has a similar sleeve-like bearing, *b'*, which takes over and fits the sleeve *b* snugly. This is the ordinary construction of these parts.

In this machine it is intended that the operator shall be able to readily remove one pair of type-wheels and replace them with another set bearing a different style of type or character, and this is one of the important advantages of the machine. Therefore it has been customary to use as a retaining device to keep the wheels in place on the stem A a nut screwed onto the top of the stem, the margin of said nut slightly overlapping the wheel-boss in a manner to prevent the wheels from slipping off the shaft until said nut shall have been removed. As the change of type-wheels is required to be effected quickly, and as the nut when removed is liable to fall into the machine, and thus cause loss of time in recovering it, and sometimes injury to the machine as well, this device has obvious disadvantages, which I avoid by my improvement thereon.

In carrying out my invention I form a sufficiently deep and capacious bore, *c*, in the upper extremity of the stem A, and fix in this bore by its lower or inner end a spring, *d*, so setting or forming this spring that it stands inclined to one side naturally, as seen in Fig. 2, and so as to bear against the side of recess *c*. On the upper projecting end of this spring I fix securely a head, *e*, the base *e'* of which is no larger in diameter than the upper end of stem A. When the type-wheels are in their proper position on the stem, as seen in Figs. 1 and 2, the normal lateral inclination or flexure of spring *d* holds the head *e* eccentric to the axis of the stem A, and with its base *e'* overlapping or projecting over the boss of the type-wheel at one side. This prevents the wheels from escaping.

To remove the type-wheels it is only necessary to press the head *e* over toward the opposite side until its base no longer overlaps the boss of the wheel. The wheels may then be slipped off the stem over said head. In Fig. 3 the type-wheels are shown as being partly slipped off from the stem. This removal of the type-wheels may be effected in an instant and with one hand, the head *e* being pushed over with one finger while the wheels are being lifted with the thumb and other fingers. The wheels may be replaced with even greater facility. The head *e* and spring *d* being fixed to stem A, it will be obvious that they cannot be mislaid, lost, or dropped into the machine in shifting the type-wheels. The spring *d* may be of flat or round wire, for example, and it may be secured to the stem A and head *e* in any manner that will be substantial.

Spring-retaining latches are not of course new with me, but my device, which is designed to be and is adapted to be employed particularly on the Hammond type-writer, has these characteristics, which I believe to be novel—namely, the spring $d$ is arranged in an axial bore, $c$, in the stem A, thus leaving the stem cylindrical and intact, so that it forms a perfect journal for the type-wheels. Said spring is also provided with a knob-like head, $e$, whereby it can be conveniently manipulated, and said head has a circular base or flange, $e'$, the diameter of which is the same or a trifle less than that of the end of stem A. The advantage of this base $e'$ is that it at all times covers the mouth of the bore $c$ and fits close down over the said mouth normally, so that dust and dirt cannot get into said bore, and it takes over the boss of the type-wheel about half-way around, thus providing an extended bearing thereon.

Having thus described my invention, I claim—

The combination, with the type-wheels, of the cylindrical stem A, on which they are rotatively mounted, said stem being provided with a bore, $c$, leaving the stem cylindrical and intact, and the spring $d$, mounted in said bore and secured at one end to the stem, said spring being provided with a head, $e$, having a flange-like base, $e'$, which closes the mouth of said bore $c$ and projects laterally over the boss of the type-wheel, normally, substantially as set forth.

In witness whereof I have hereunto signed my name in the presence of two subscribing witnesses.

MORRIS WEISS.

Witnesses:
HENRY CONNETT,
J. D. CAPLINGER.